(12) United States Patent
Pae et al.

(10) Patent No.: US 7,561,497 B2
(45) Date of Patent: Jul. 14, 2009

(54) OPTICAL PICK-UP ACTUATOR AND METHOD, AND REPRODUCING AND/OR RECORDING APPARATUS WITH SAME

(75) Inventors: Jung-gug Pae, Suwon-si (KR);
Seok-jung Kim, Suwon-si (KR);
Soo-han Park, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 603 days.

(21) Appl. No.: 11/137,517

(22) Filed: May 26, 2005

(65) Prior Publication Data
US 2005/0265141 A1 Dec. 1, 2005

(30) Foreign Application Priority Data
May 28, 2004 (KR) .................. 10-2004-0038118

(51) Int. Cl.
*G11B 7/00* (2006.01)
(52) U.S. Cl. .................................... 369/44.14
(58) Field of Classification Search ............. 369/44.11, 369/44.37, 44.14, 44.15, 44.12, 44.16
See application file for complete search history.

(56) References Cited

U.S. PATENT DOCUMENTS 6,021,107 A    2/2000   Tsukahara

FOREIGN PATENT DOCUMENTS

| CN | 1423257 | 6/2003 | | |
|---|---|---|---|---|
| CN | 1495734 | 5/2004 | | |
| EP | 1 316949 | 6/2003 | | |
| EP | 1316946 A2 | * | 6/2003 | ............. 369/44.11 |
| EP | 1316949 | * | 6/2003 | ............. 369/44.11 |
| EP | 1 394 783 | 3/2004 | | |
| JP | 9-171630 | 6/1997 | | |
| JP | 9-212910 | 8/1997 | | |
| JP | 9-297927 | 11/1997 | | |
| JP | 2000-20987 | 1/2000 | | |
| JP | 2002-245650 | 8/2002 | | |
| JP | 2003-45054 | 2/2003 | | |
| KR | 2003-0045259 | 6/2003 | | |

OTHER PUBLICATIONS

Chinese Patent Office Action, mailed Nov. 10, 2006, and issued in corresponding Chinese Patent Application No. 200510074668.1.
Shinoda et al. "Optical Pick-Up For DVD", IEEE transactions on Consumer Electronics, vol. 42, No. 3, Aug. 1996.

* cited by examiner

*Primary Examiner*—Nabil Z Hindi
(74) *Attorney, Agent, or Firm*—Staas & Halsey LLP (57) ABSTRACT

An actuator for an optical pick-up, including: a holder fixed to a base; a bobbin capable of accommodating a plurality of objective lenses for recording and/or reproducing information onto and/or from optical discs with different recording densities; a suspension for connecting the bobbin and the holder, and supporting the bobbin to be movable; and a magnetic circuit for driving the bobbin in focusing, tilting, and tracking directions, wherein the magnetic circuit includes a plurality of focusing/tilting coils installed in the bobbin to be in correspondence to the plurality of lenses, and driving the bobbin in at least one of focusing and tilting directions; a plurality of magnets having the focusing/tilting coils therebetween, in which same polarities of the magnets make one pair; and tracking coils supported by the bobbin, and generating a driving force to drive the bobbin in the tracking direction.

25 Claims, 6 Drawing Sheets

OPTICAL PICK-UP ACTUATOR AND METHOD, AND REPRODUCING AND/OR RECORDING APPARATUS WITH SAME

CROSS-REFERENCE TO RELATED APPLICATION

This application claims benefit under 35 U.S.C. § 119 from Korean Patent Application No. 2004-38118, filed on May 28, 2004, the entire content of which is incorporated herein by reference.

BACKGROUND OF THE INVENTION

1. Field of the Invention

Embodiments of the present invention relate in general to an actuator for an optical pick-up, and, more specifically, to an actuator for an optical pick-up capable of accommodating a plurality of objective lens for recording and/or reproducing information onto and/or from a plurality of optical discs having different recording densities.

2. Description of the Related Art

A digital versatile disc (hereinafter, it will be abbreviated to DVD), as well known, uses a light having a wavelength of 650 nm (or 635 nm), and an objective lens with a numerical aperture of 0.6 (0.65 for a DVD RW) to record and/or reproduce information onto and/or from the disc. Suppose that a DVD has a diameter of 120 mm, and a track pitch of 0.74 μm. Usually, this type of DVD has a recording (or storage) capacity of greater than 4.7 GB for one side.

Unfortunately however, the DVD is not adequate as a recording medium for recording HD (High Definition) moving images. This is because to record HD moving images lasting, say, 135 minutes, at least 23 GB/side of recording capacity is required.

To meet the demand for a high-density recording capacity, blue light with a wavelength shorter than red light, and an objective lens with a numerical aperture greater than 0.6 are now used. In addition, greater efforts have been given to the development and standardization of a next generation DVD, or a high-definition optical disc having a narrower track (hereinafter, referred to as HD-DVD (High Definition-DVD)).

On the other hand, as an optical disc employs an objective lens with a larger numerical aperture, the thickness of the optical disc should be reduced in order to assure tilting tolerance of the optical disc. In consideration of an allowable tilting tolerance of the optical disc, the thickness of a DVD has been reduced to 0.6 mm, which is less than the thickness of a CD, 1.2 mm. It is possible that the thickness of a future HD-DVD may be reduced to 0.1 mm. Also, the numerical aperture NA of the objective lens has been increased from 0.45 for a CD to 0.6 for a DVD, while there is a high possibility that the NA of the objective lens for use in the HD-DVD will be as high as 0.85. As for a light source of the HD-DVD, a bluish-purple light source will be the best choice, considering the recording capacity requirement. A problem for the development of a new standard optical disc, though, is whether the new optical disc can be compatible with existing optical discs.

In effect, designing and manufacturing an objective lens having a high numerical aperture of 0.85, for example, involves very complicated technologies, and extending the working distance of the objective lens for use in the HD-DVD to be equal to the objective lens for use in the DVD is a difficult task.

To solve the above problem with the working distance, a compatible optical pick-up for high density recording/reproduction needs at least one objective lens for recording/reproducing information on/from a CD and/or DVD, and an additional objective lens having a higher numerical aperture for high density recording.

Meanwhile, an actuator for such an optical pick-up includes a magnetic circuit which enables the objective lens to drive in focusing and tracking directions. In the focusing direction the actuator ensures that the space between the optical disk and the objective lens is fixed, and in the tracking direction the actuator moves the objective lens to a desired tracking position (center of tracking).

However, the above-described optical pick-up utilizing a plurality of optical discs with different recording densities interchangeably requires objective lenses in one-to-one correspondence to each of the plurality of optical lenses. In general, the actuator for an optical pick-up with a plurality of objective lenses is installed in such a manner that the objective lenses loaded on a movable unit are able to move in focusing and tracking directions.

Figure 1:
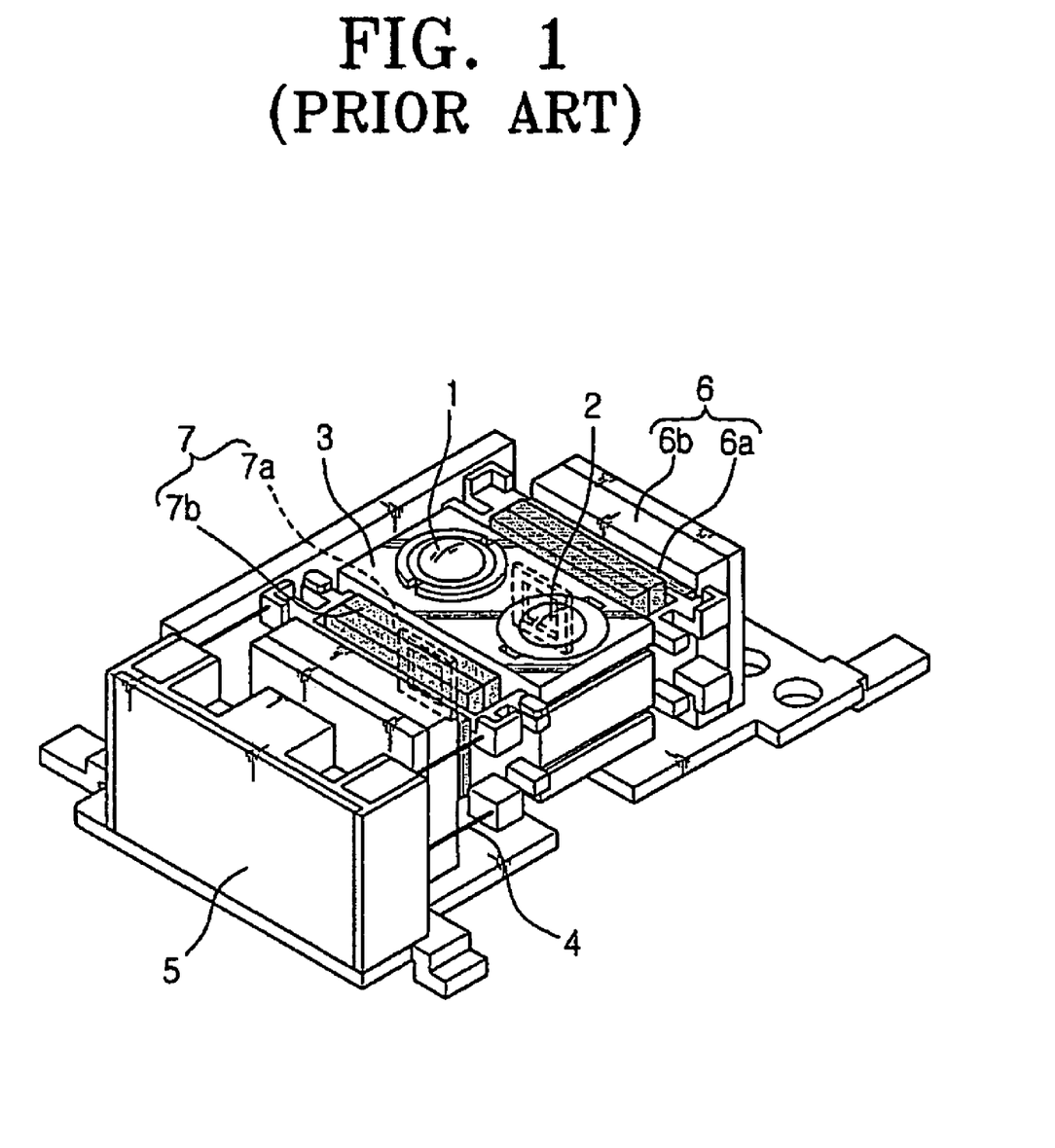
FIG. 1 is a schematic perspective view of a related art actuator for an optical pick-up.

In this regard, the applicant of the present invention introduced, in Korean Laid-Open Publication No. 2003-0045259, an actuator for an optical pick-up shown in FIG. 1, which is capable of driving two objective lenses 1 and 2. Referring to FIG. 1, a bobbin 3 for holding the objective lenses 1 and 2, is movably supported by a holder 5 with the aid of suspension members 4. The bobbin 3 is driven in a focusing direction by a first magnetic circuit 6 having a focusing coil 6a and a focusing magnet 6b. Also, the bobbin 3 is driven in a tracking direction by a second magnetic circuit 7 having a tracking coil 7a, wound around the bobbin 3, and a tracking magnet 7b. Therefore, the actuator drives those two objective lenses 1 and 2 to record/reproduce information on/from a plurality of differing types of optical discs, each having different recording densities and thicknesses. More details on the optical pickup actuator illustrated in FIG. 1 can be found in Korean Laid-Open Publication No. 2003-0045259 and thus, will not be provided here.

However, the related art optical pick-up actuators having the above construction are often faced with a problem caused by low stiffness of the bobbin 3 holding the coils 6a and 7a. As a result, a shortage of a gain margin occurs relating to the resonance frequency of the secondary coil and secondary resonance.

In addition, the pairing of the magnetic circuits 6 and 7 and their magnets 6b and 7b, along with internal & external yokes, installed in the optical pick-up actuator, only makes the entire structure and mechanism of the optical pick-up actuator more complicated.

SUMMARY OF THE INVENTION

It is, therefore, an aspect of the present invention to provide an actuator and method for an optical pick-up featuring a simplified structure with high sensitivity.

To achieve the above and/or other aspects and advantages, embodiments of the present invention set forth an actuator for an optical pick-up, including a holder fixed to a base, a bobbin to accommodate a plurality of objective lenses for recording and/or reproducing information onto and/or from different media, each with different recording densities, a suspension for connecting the bobbin and the holder, and supporting the bobbin to be movable, and a magnetic circuit for driving the bobbin, wherein the magnetic circuit includes a plurality of focusing/tilting coils, installed at the bobbin to be in correspondence with the plurality of lenses, and driving the bobbin in at least one of focusing and tilting directions, a plurality of magnets having the focusing/tilting coils therebetween, wherein same polarities of the magnets make one pair, and tracking coils, supported by the bobbin, for generating a driving force to drive the bobbin in a tracking direction.

The plurality of magnets may be disposed to have opposing polarities between neighboring magnets. In addition, the plurality of magnets may be 2-pole magnets polarized in the tracking direction.

The bobbin may include a pair of lens mount holes for mounting the objective lenses. The focusing/tilting coils may be wound in a rectangular shape to be homocentric around the lens mount holes. Further, the focusing/tilting coils may be wound to have a designated height in the focusing direction.

The focusing/tilting coils may be disposed in parallel to each other in the tracking direction. The magnetic circuit may further include a plurality of internal yokes disposed inside the focusing/tilting coils, respectively, for focusing magnetic flux from the focusing/tilting coils. The internal yokes may be fixed to the base facing sides of the focusing/tilting coils, the sides being arranged in the tracking direction. Further, the magnetic circuit may also include a plurality of external yokes fixed to the base for guiding magnetic flux from the plurality of magnets. The plurality of magnets may be supported by the external yokes, respectively.

The pair of tracking coils may be installed in both outer surfaces of the bobbin to be in correspondence with the plurality of magnets, respectively. In addition, the tracking coils may be wound in a rectangular shape, and disposed on opposite sides from each other while being laid overlapped with neighboring magnets, respectively. The tracking coils can be disposed in such a manner that sides of the tracking coils, parallel to the focusing direction, interact with the magnets, respectively, to generate an electromagnetic force. In the tracking direction, each tracking coil may also lie between the focusing/tilting coils.

The plurality of magnets may be a pair of 2-pole magnets polarized in the tracking direction, the polarized magnets being disposed opposite to each other having the bobbin therebetween.

The bobbin may include a pair of lens mount holes for mounting the objective lenses, and the mount holes are disposed in a radial direction of a medium.

To achieve the above and/or other aspects and advantages, embodiments of the present invention set forth an actuator for an optical pick-up, including a holder fixed to a base, a bobbin to accommodate a pair of objective lenses for recording and/or reproducing information onto and/or from media, each with different recording densities, a suspension for connecting the bobbin and the holder, and supporting the bobbin to be movable, and a magnetic circuit for driving the bobbin, wherein the magnetic circuit includes a pair of focusing/tilting coils wound in correspondence with the pair of objective lenses to be installed in the bobbin, a pair of tracking coils installed respectively along both outer surfaces of the bobbin, and a pair of polarized magnets disposed in a radial direction of a medium and having the bobbin therebetween to face the focusing/tilting coils and the tracking coils, respectively.

The polarized magnets are 2-pole magnets may be polarized in the tracking direction, respectively, with same polarities thereof being faced with each other, with the bobbin inbetween.

The focusing/tilting coils may be disposed in the tracking direction. Each tracking coil may be disposed between the focusing/tilting coils, being laid overlapped with both focusing/tilting coils, respectively, in the tracking direction. The bobbin may include a pair of lens mount holes for mounting the objective lenses, with the lens mount holes being disposed in the tracking direction. In addition, the bobbin may include a pair of lens mount holes having different depths; one of the lens mount holes may have a longer depth for a low density medium having a long working distance.

To achieve the above and/or other aspects and advantages, embodiments of the present invention set forth an optical recording and/or reproducing apparatus, including a spindle motor for rotating a recording medium, an optical pickup includinging an objective lens and an actuator which actuates the objective lens so as to transfer information to/from the recording medium, a control unit driving the spindle motor and the optical pickup to transfer the information with respect to the recording medium and controlling the actuator of the optical pickup in track, tilt, and/or focusing directions, wherein the actuator includes a holder fixed to a base, a bobbin to accommodate a plurality of objective lenses for recording and/or reproducing information onto and/or from different media, each with different recording densities, a suspension for connecting the bobbin and the holder, and supporting the bobbin to be movable, and a magnetic circuit for driving the bobbin, wherein the magnetic circuit includes a plurality of focusing/tilting coils, installed at the bobbin to be in correspondence with the plurality of lenses, and driving the bobbin in at least one of focusing and tilting directions, a plurality of magnets having the focusing/tilting coils therebetween, wherein same polarities of the magnets make one pair, and tracking coils, supported by the bobbin, for generating a driving force to drive the bobbin in a tracking direction.

To achieve the above and/or other aspects and advantages, embodiments of the present invention set forth a bobbin for an actuator, including a body including first and second lens mounts, separated first and a second spaces with respective focusing and/or tilting coils, wherein the first and second lens mount holes correspond with respective first and second spaces. The first and second lens mounts are each holes having different depths. The lens mounts may be holes having recesses formed at different positions from the top surface of the bobbin.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present invention, examples of which are illustrated in the accompanying drawings, wherein like reference numerals refer to the like elements throughout. The embodiments are described below to explain the present invention by referring to the figures.

Referring to FIGS. 2 through 5, an actuator for an optical pick-up, according to an embodiment of the present invention, includes a base 10, a holder 11 fixed to the base 10, a bobbin 20 with lens mount holes 21 and 23, where a plurality of objective lenses 31 and 33, possibly having different working distances, are mounted, suspensions 13 for connecting the bobbin 20 and the holder 11, and magnetic circuits for driving the bobbin 20 in a focusing, tilting, and tracking direction.

Figure 2:
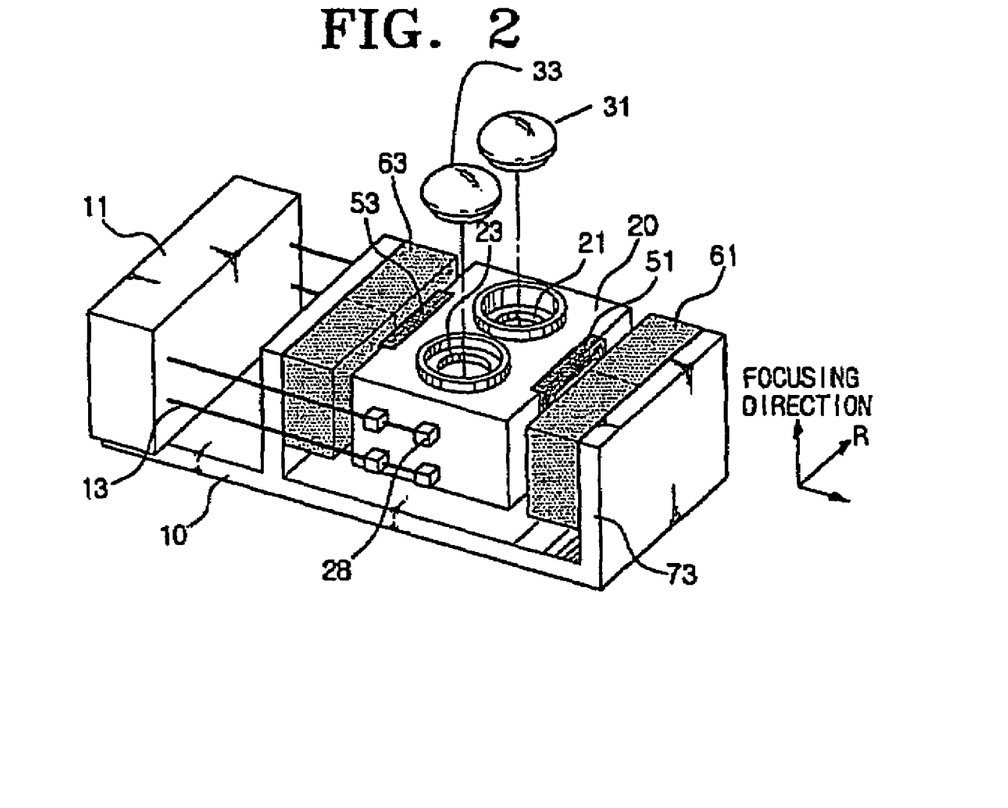
FIG. 2 is a schematic perspective view of an actuator for an optical pick-up, according to an embodiment of the present invention.
Figure 3:
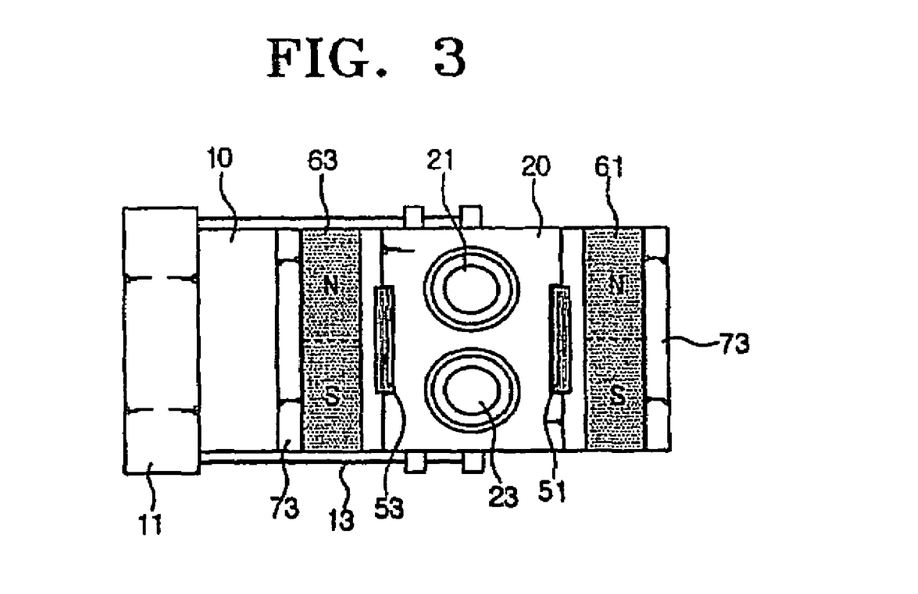
FIG. 3 is a top plan view of an actuator for an optical pick-up as shown in FIG. 2, according to an embodiment of the present invention.

The plurality of objective lenses 31 and 33 include a first objective lens 31 for recording/reproducing information onto/from at least one of any low density optical disc, each having different recording densities, and a second objective lens 33 for recording/reproducing information onto/from any optical disc having a higher density than the low density optical disc (hereinafter, it will be referred to as a high density optical disc). For example, the first objective lens 31 may record/reproduce information onto/from an optical disc selected among low density DVDs (hereinafter, it will be referred to as a DVD), and additionally an optical disc selected among CDs (hereinafter, it will be referred to as a CD). The second objective lens 33, on the other hand, may record/reproduce information onto/from an optical disc selected among DVDs having higher recording densities than standard DVDs, e.g., HD-DVDs. To facilitate the information recording/reproduction operations onto/from three (or more) optical discs with different recording densities, three (or more) objective lenses having different working distances can be utilized.

In the actuator of the present invention, the objective lenses 31 and 33 can be installed in one bobbin 20 in a radial direction (R direction) of the optical discs. In so doing, the actuator can be made compatible with an optical pick-up utilizing a plurality of objective lenses.

In the case that two objective lenses 31 and 33 need to be loaded as shown in FIG. 2, the bobbin 20 can include a first lens mount hole 21 for mounting the first objective lens 31, and a second lens mount hole 23 for mounting the second objective lens 23. Here, the number of lens mount holes formed in the bobbin 20 is equal to the number of objective lenses to be mounted thereon.

Figure 5:
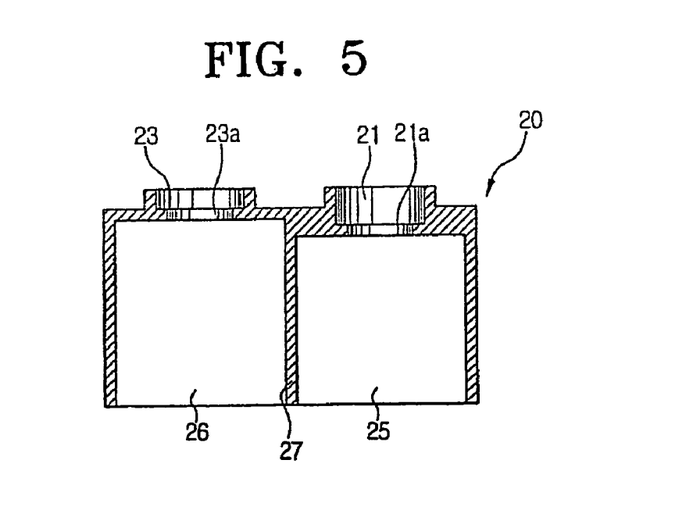
FIG. 5 is a cross-sectional view for a bobbin as shown in FIG. 2, according to an embodiment of the present invention.

The first and second lens mount holes 21 and 22 are disposed in the R direction. And, the lens mount holes 21 and 23, as shown in FIG. 5, may have different depths, so that the objective lenses 31 and 33 mounted thereon can have different heights. That is, inside the first lens mount hole 21 is a recess 21a that is formed at a relatively deep position from the top surface of the bobbin 20 opposite to the optical disc. This ensures that the first objective lens 31, which is a low density optical disc having a long working distance, is safely installed therein. Similarly, a recess 23a is formed in the second lens hole 23, but this time the recess 23a is formed high enough to touch the top surface of the bobbin 20 opposite to the optical disc (or at a position that is higher than the recess 21a formed in the first lens mount hole 21 to be closer to the top surface of the bobbin 20). Thus, the second objective lens 33, which is a high density optical disc having a short working distance, may be fitted to the recess 23a.

The top surface of the bobbin 20 is opened through the lens mount holes 21, 23, and the structure of the low portion of the bobbin 20 is a hexahedron in shape, being opened through a first and a second space 25 and 26. The first and second spaces 25 and 26 are separated in the R direction by a barrier rib 27, e.g., in the middle between the first and second spaces 25 and 26. Inside the first space 25 can be a first focusing/tilting coil 41 (described more fully below), and inside the second space 26 can be a second focusing/tilting coil 43 (described more fully below).

The bobbin 20 can be movably supported by the holder 11 with the aid of suspensions 13. The suspensions 13 may be a spring wire that has a designated stiffness yet is elastically transformable at the same time, though the present invention is not limited thereto. Outside the bobbin 20 is a connecting piece 28 attached to each suspension 13. The bobbin 20 can be made out of plastic materials, and can be manufactured by injection molding, for example.

Magnetic circuits can be utilized for driving the objective lenses 31 and 33 in the focusing, tracking (hereinafter, it will be referred to as R-direction), and tilt directions. The magnetic circuit includes a first and second focusing/tilting coils 41 and 43, a first and second tracking coils 51 and 53, and first and second polarized magnet 61 and 63.

The first and second focusing/tilting coils 41 and 43 are installed in the R direction inside the bobbin 20, that is, in the first and second spaces 25 and 26, shown in FIG. 5, respectively. The first and second focusing/tilting coils 41 and 43 have a rectangular shape, being homocentric in the focusing direction. The first and second focusing/tilting coils 41 and 43 can be wound in the focusing direction up to a designated height, and more specifically, each coil can be wound around the first and second objective lenses 31 and 33.

The bobbin 20 is driven in the focusing and tilting directions by a driving force generated from an interaction between a pair of short sides (which are in parallel to the R direction) of the first and second focusing/tilting coils 41 and 43 and the first and second polarized magnets 61 and 63.

Figure 4:
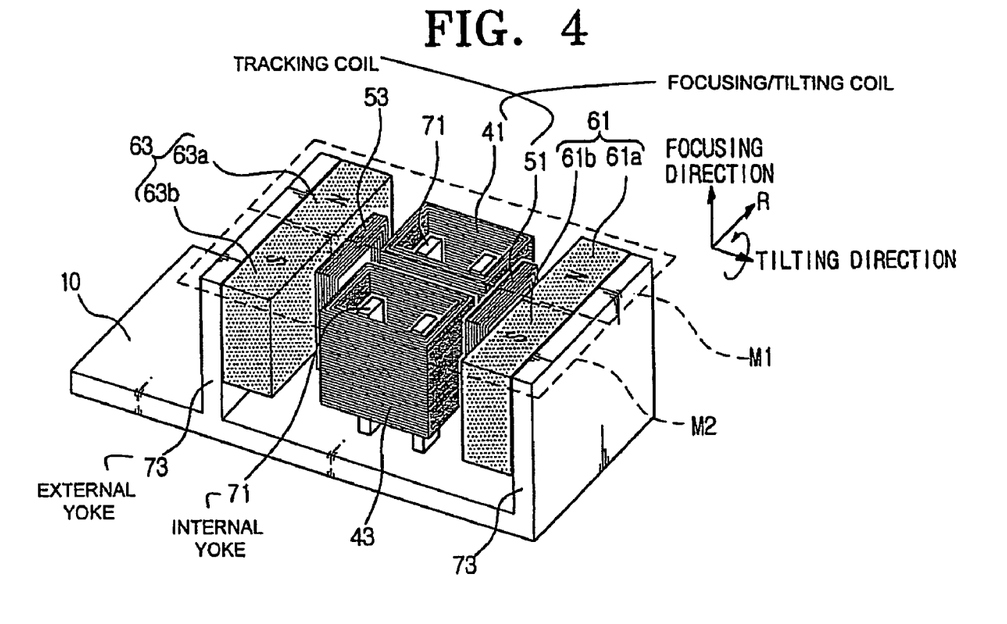
FIG. 4 is a perspective view showing a configuration of magnetic circuits installed in an actuator, e.g., for an optical pick-up as shown in FIG. 2, according to an embodiment of the present invention.

As shown in FIG. 4, the first and second tracking coils 51 and 53 are installed, respectively, in the bobbin's outer surface to be parallel to the R direction. Preferably, the first and second tracking coils 51 and 53 are disposed in such a manner that the center of each tracking coil 51 and 53 lies between the first and second focusing/tilting coils 41 and 43. In effect, the center of each polarized magnet 61 and 63, i.e., the center of the N-pole and the S-pole of each magnet lies on the same line with the center of each focusing/tilting coil 41 and 43. Also, each tracking coil 51 and 53 can be wound in a rectangular shape, so the sides of the rectangular-shaped tracking coils 51 and 53 in the focusing direction are faced with the N-pole portions 61a and 63a and the S-pole portions 61b and 63b of the polarized magnets 61 and 63. Therefore, a driving force generated from the interaction between the first and second tracking coils 51 and 53 and the first and second polarized magnets 61 and 63 is applied to the bobbin, and as a result thereof, the bobbin is moved in the tracking direction.

The first and second polarized magnets 61 and 63 have the bobbin 20 between them, and are disposed, respectively, at a designated distance from the bobbin's outer surfaces that are in parallel to the R direction. Each polarized magnet 61 and 63 has the N-pole portion 61a and 63b, and the S-pole portion 61b and 63a in the R direction. The first and second polarized magnets 61 and 63 interact not only with the first and second focusing/tilting coils 41 and 43, but also with the first and second tracking coils 51 and 53. That is to say, both polarized magnets 61 and 63 are involved with driving the bobbin 20 in the focusing, tilting, and tracking directions and thus, they are arranged to meet such purposes. In other words, the N-pole portions and the S-pole portions of the first and second polarized magnets 61 and 63 are located to be in correspondence to each other, i.e., same polarities are facing each other.

More specifically speaking, the N-pole portion 61a of the first polarized magnet 61 is located on the opposite side of the N-pole portion 63a of the second polarized magnet 63, having the first focusing/tilting coil 41 therebetween. Likewise, the S-pole portion 61b of the first polarized magnet 61 is located on the opposite side of the S-pole portion 63b of the second polarized magnet 63, having the second focusing/tilting coil 43 therebetween.

For convenience, supposing that the N-pole portion 61a of the first polarized magnet 61 and the N-pole portion 63a of the second polarized magnet 63 are called a first magnet M1, and the S-pole portion 61b of the first polarized magnet 61 and the S-pole portion 63b of the second polarized magnet 63 are called a second magnet M2, then the first and second magnets M1 and M2 may interact with the first and second focusing/tilting coils 41 and 43, with an electromagnetic force being generated from the corresponding interaction. This becomes the driving force for driving the bobbin 20 in the focusing and tilting directions. This mechanism will be described in greater detail below.

According to an aspect of the present invention, the magnetic circuit further includes internal yokes 71 disposed inside the first and second focusing/tilting coils 41 and 43, and external yokes 73 installed in correspondence to (or next to) the first and second polarized magnets 61 and 63, respectively.

A pair of the internal yokes 71 are disposed inside each focusing/tilting coil 41 and 43. Preferably, the effective parts of the focusing/tilting coils 41 and 43 are disposed in the R direction. The internal yokes 71 can be fixed to the base 10, or combined with the base 10 as one body, and may be made out of the same material as the base 10, for example. The internal yokes 71 can be spaced from the focusing/tilting coils 41 and 43, and guide magnetic flux generated from the focusing/tilting coils 41 and 43 in the focusing/tilting directions, thereby maximizing an effective magnetic field intensity.

The external yokes 73 can be fixed to the base 10 as one body with the base 10. The external yokes 73 are also disposed on the opposite sides from the outer surfaces of the first and second polarized magnets 61 and 63, while the inner surfaces of the first and second polarized magnets 61 and 63 face the bobbin 20. The external yokes 73 may support the first and second polarized magnets 61 and 63, respectively. The external yokes 73 guide magnetic flux of a magnetic field generated from each polarized magnet 61 and 63, and focus it towards the bobbin 20, thereby maximizing an effective magnetic field intensity.

The following will now describe in detail the operational effect of the optical pick-up actuator according to an embodiment of the present invention.

To begin with, the direction of a driving force generated from the interaction between the first and second focusing/tilting coils 41 and 43, and the first and second magnets M1, M2 will be described.

Figure 6A:
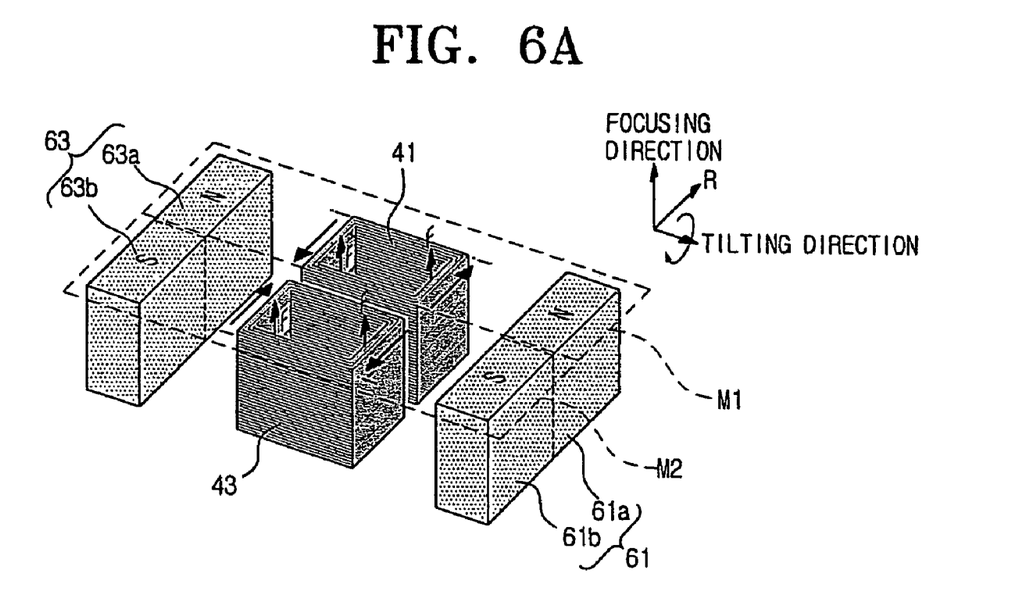
FIGS. 6A and 6B respectively illustrate diagrammatically a principle applied to the motion of a bobbin in a focusing direction by a magnetic circuit for an actuator as shown in FIG. 4.

As shown in FIG. 6A, the first and second polarized magnets 61 and 63 are disposed on the opposite sides from each other, having the first and second focusing/tilting coils 41 and 43 therebetween. The first focusing/tilting coil 41 is driven by an interaction with first magnet M1, and the second focusing/tilting coil 43 is driven by an interaction with the second magnet M2. As depicted in FIG. 6A, when magnetic fields from the N-pole portions 61a and 63a of the first magnet M1 repel toward the inward direction and current flowing in a counterclockwise direction is applied to the first focusing/tilting coil 41, according to Fleming's left-hand law, force is applied upward to the sides of the first focusing/tilting coil 41 that are arranged in the R direction. In addition, when magnetic fields from the S-pole portions 61b and 63b of the second magnet M2 repel toward the outward direction and current flowing in a clockwise direction is applied to the second focusing/tilting coil 43, according to Fleming's left-hand law, force is applied upward to the sides of the second focusing/tilting coil 43, which are arranged in the R direction. In short, as shown in FIG. 6A, when current is applied to the first and second focusing/tilting coils 41 and 43 in opposite directions, a movable unit including the bobbin 20, the first and second objective lens 31 and 33, the first and second focusing/tilting coils 41 and 43, and the first and second tracking coils 51 and 53 moves upward.

Figure 6B:
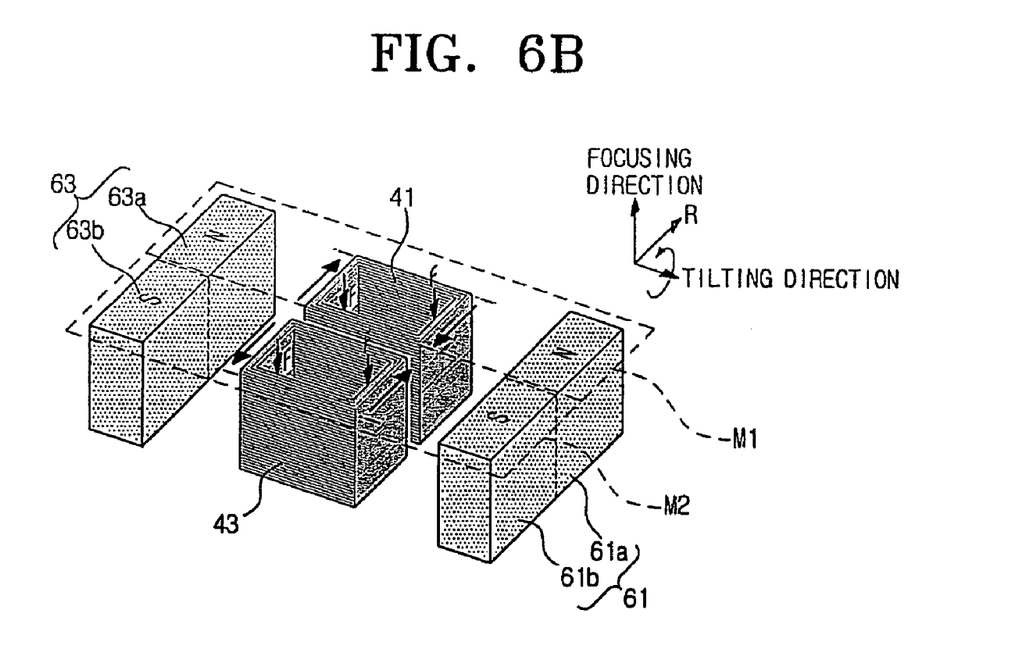

Referring to FIG. 6B, current flowing in opposite directions from those in FIG. 6a can be applied to the first and second focusing/tilting coils 41 and 44, respectively. In such cases, force is applied downward to the sides of the first and second focusing/tilting coils 41 and 43, respectively. Accordingly, by adjusting the polarity and amount of current applied to the first and second focusing/tilting coils 41 and 43, it becomes possible to adjust the focusing directions of the first and second objective lenses 31 and 33 installed in the bobbin 20 to different directions.

Figure 7A:
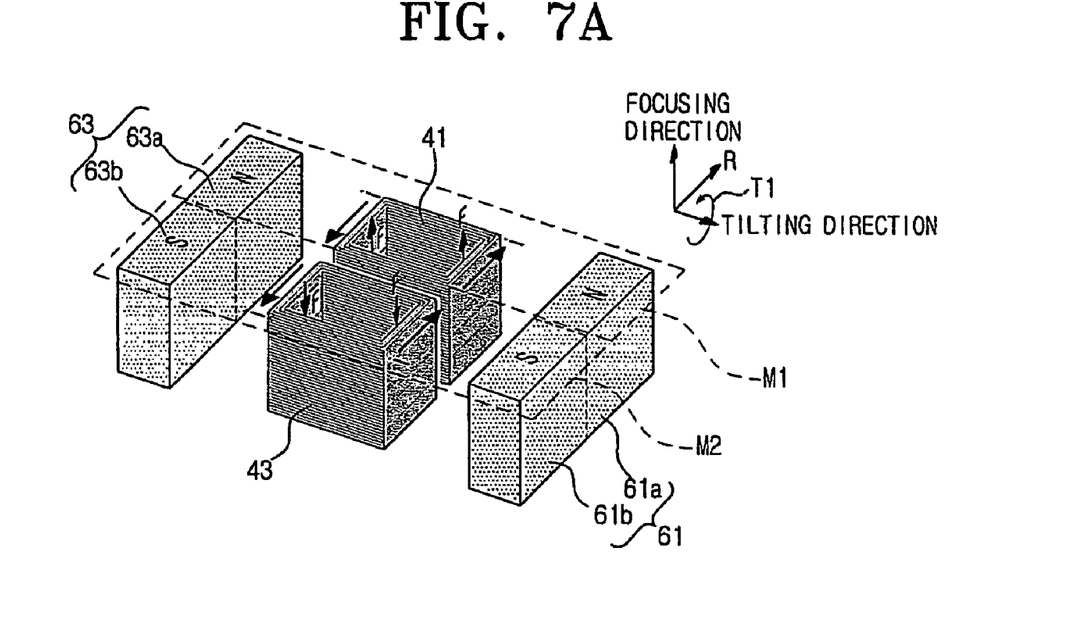
FIGS. 7A and 7B respectively illustrate diagrammatically a principle applied to the motion of a bobbin in a tilting direction by a magnetic circuit for an actuator as shown in FIG. 4.

Referring to FIG. 7A, when current flowing in a counterclockwise direction is applied simultaneously to the first and second focusing/tilting coils 41 and 43, as described with reference to FIG. 6A, force is applied upward to the first focusing/tilting coil 41. Meanwhile, as described with reference to FIG. 6B, force is applied downward to the second focusing/tilting coil 43. Thus, the bobbin 20 is tilted and driven in the tilting direction T1.

Figure 7B:
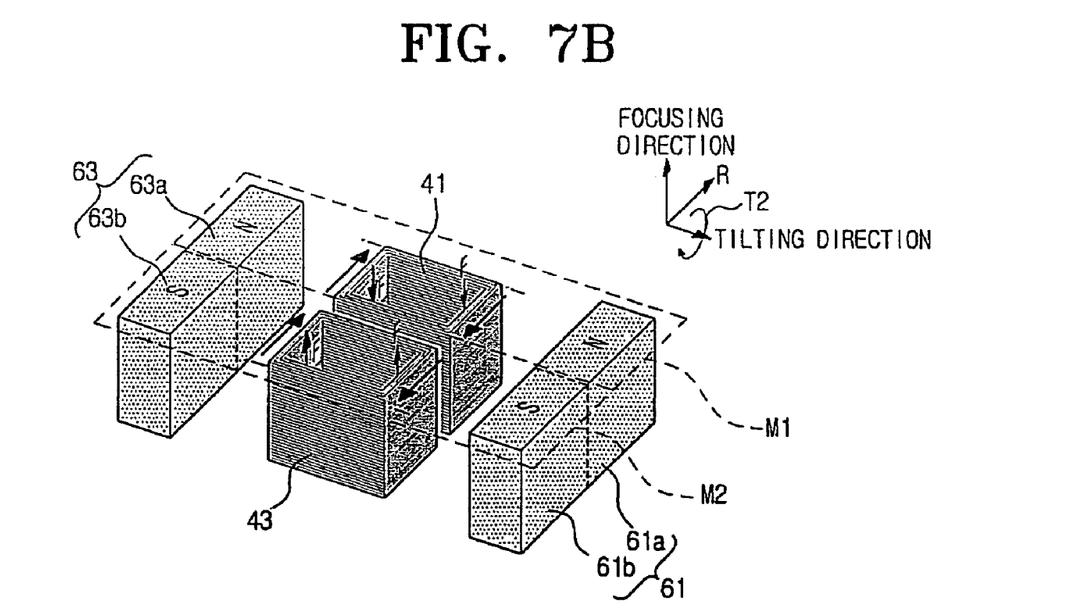

In contrast, as shown in FIG. 7B, when current flowing in a clockwise direction is applied simultaneously to the first and second focusing/tilting coils 41 and 43, force is applied downward to the first focusing/tilting coil 41 as described with reference to FIG. 6B. Meanwhile, force from the interaction with the second magnet M2 is applied upward to the second focusing/tilting coil 43 as described with reference to FIG. 6A. Thus, the bobbin 20 is tilted and driven in the tilting direction T2. To be short, to drive the first and second objective lenses 31 and 33, loaded in the bobbin 20, in the tilting direction, current flowing in a clockwise or counterclockwise direction should be applied simultaneously to each focusing/tilting coil 41 and 43. Also, by adjusting the amount of current, it becomes possible to control the tilting direction of the objective lenses.

The following will now describe the operational effect of the bobbin 20 driven in the tracking direction, as a result of the interaction between the first and second tracking coils 51 and 53 and the first and second polarized magnets 61 and 63.

Figure 8A:
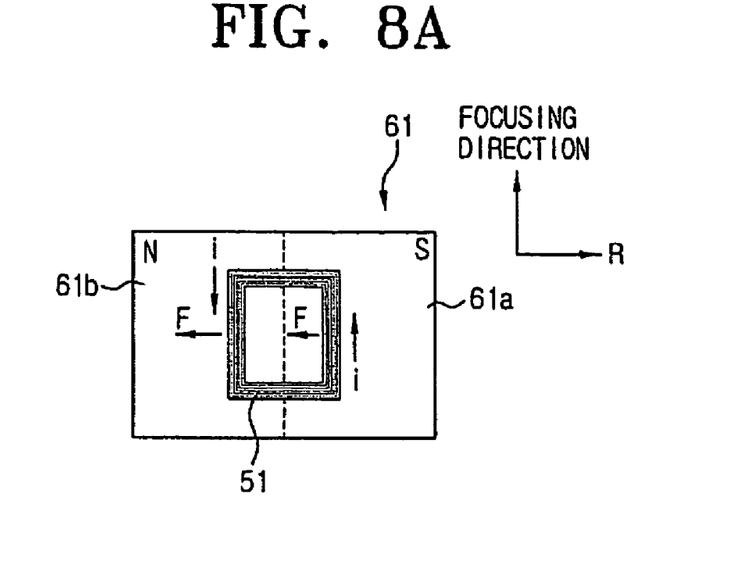
FIGS. 8A and 8B respectively illustrate diagrammatically a principle applied to the motion of a bobbin in a tracking direction by a magnetic circuit for an actuator as shown in FIG. 4.

As shown in FIG. 8A, the first tracking coil 51 faces the first polarized magnet 61, whose N-pole and S-pole are polarized in the R direction. The first tracking coil 51 has longer sides in the vertical direction, with the long sides being disposed to be in correspondence to the N-pole portion 61a and the S-pole portion 61b, respectively. In this state, when a magnetic field from the N-pole portion 61a flows from the ground and current flows to the long sides of the first tracking coil 51, in a counterclockwise direction, as shown in FIG. 8A, those long sides effectively become tracking coils generating an electromagnetic force. When current flowing in a counterclockwise direction is applied to the first tracking coil 51, force is applied to the left side of the long sides.

Figure 8B:
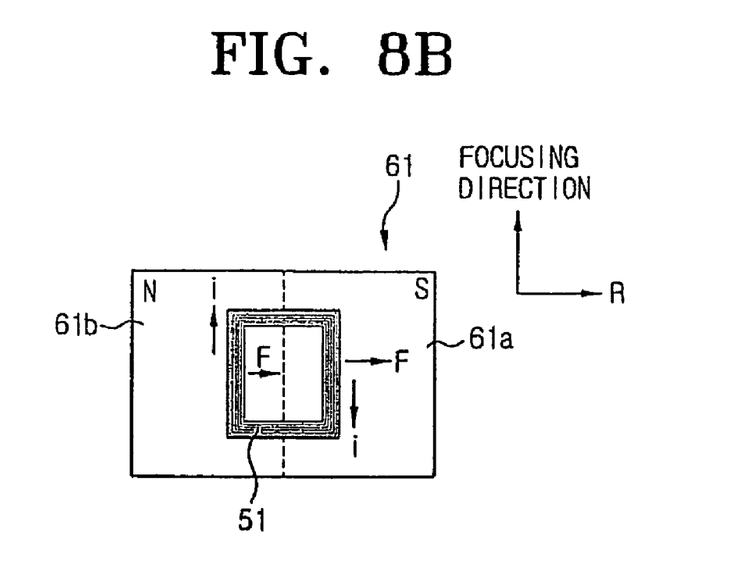

Meanwhile, as shown in FIG. 8B, when current flows to the first tracking coil 51 in a clockwise direction, force is applied to the right side of the long sides. Therefore, by adjusting the polarity and amount of current applied to the first tracking coil 51, it becomes possible to drive the first and second objective lenses 31 and 33. loaded in the bobbin 20, in the tracking direction.

Details on the principle of the force applied to the second tracking coil, as a result of the interaction between the second tracking coil 53 and the second polarized magnet 63, will not be provided here since it can be induced from the description related to FIGS. 8A and 8B. It is sufficient to say here that the bobbin 20 can be driven in the tracking direction by adjusting the polarity and amount of current applied to the second tracking coil 53.

Needless to say, the actuator having the bobbin 20 mounted with two objective lenses 31 and 33 is heavier than a general actuator having a bobbin mounted with one objective lens. According to the actuator of the present invention, however, the number of focusing/tilting coils 41 and 43 for driving the bobbin 20 in the focusing and tilting directions is equal to the number of objective lenses 31 and 33, and the focusing/tilting coils 41 and 43 are installed in the bobbin 20, so the outer size of the bobbin 20 has not bee increased, while a greater driving force than the general actuator can be generated. Along this line, driving the bobbin 20 in the focusing direction becomes much easier. Therefore, when controlling the position of the bobbin 20, deterioration in sensitivity caused by an increase in weight or occurrence of secondary resonance can be prevented.

Accordingly, the tracking coils 51 and 53 for driving the bobbin 20 in the tracking direction can be installed in the bobbin 20. To this end, the first and second polarized magnets 61 and 63 are preferably utilized. In this way, the weight of tracking coils 51 and 53 in the actuator of the present invention becomes lower than that of tracking coils in the conventional actuator.

In addition, by sharing a pair of polarized magnets 61 and 63, with the focusing/tilting coils 41 and 43 and the tracking coils 51 and 53, less magnets are needed for the actuator of the present invention, yet equivalent effects are generated, despite the reduced number of magnets. In short, the number of components in the actuator as well as the size of the actuator are decreased, and as a result, the cost of manufacture is greatly reduced.

In an embodiment of the present invention, two objective lenses 31 and 33 were loaded in one bobbin 20. However, this is for illustrative purposes only. For example, although there are two lens mount holes 21 and 23 in the bobbin 20, if necessary, only one lens mount hole can be used. Even in such case, the magnetic circuit can be employed for adjusting the position of the objective lens more easily.

Embodiments of the present invention actuator, having the bobbin 20 mounted with more than one objective lens can be applied to an optical pick-up for recording/reproducing information onto/from two or more optical discs with different recording densities, such as CD, DVD, and HD-DVD, for example.

As described so far, the actuator for the optical pick-up, according to embodiments of the present invention, includes one bobbin mounted with two objective lenses, and a magnetic circuit for adjusting the objective lenses in the focusing, tilting, and tracking directions. Here, the magnetic circuit has a lessened number of elements, which in turn reduces the entire size of the actuator and the cost of manufacture thereof.

Moreover, to increase the driving force, the number of focusing/tilting coils for adjusting the position of each objective lens can be equal to the objective lenses used.

More precise control over the position adjustment of the bobbin can be realized, and the secondary resonant frequency related problems are no longer found. Consequently, sensitivity of the actuator can be improved, noting that the present invention actuator can also be applied to a high-speed optical recording/reproduction devices (not shown). Such recording and/or reproducing apparatuses are not illustrated herein as they can be easily derived from conventional recording and/or reproducing apparatuses using the above disclosure and implementation of the same for additional embodiments of the presently claimed invention.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An actuator for a pick-up, comprising:
    a holder fixed to a base;
    a bobbin to accommodate a plurality of objective lenses for recording and/or reproducing information onto and/or from different media, each with different recording densities;
    a suspension for connecting the bobbin and the holder, and supporting the bobbin to be movable; and
    a magnetic circuit for driving the bobbin,
    wherein the magnetic circuit comprises:
    a plurality of focusing/tilting coils, installed at the bobbin to be in correspondence with the plurality of lenses, and driving the bobbin in at least one of focusing and tilting directions;
    a plurality of magnets having the focusing/tilting coils therebetween, wherein same polarities of the magnets make one pair; and
    tracking coils, supported by the bobbin, for generating a driving force to drive the bobbin in a tracking direction.

2. The actuator according to claim 1, wherein the plurality of magnets are disposed to have opposing polarities between neighboring magnets.

3. The actuator according to claim 1, wherein the plurality of magnets are 2-pole magnets polarized in the tracking direction.

4. The actuator according to claim 1, wherein the bobbin comprises a pair of lens mount holes for mounting the objective lenses.

5. The actuator according to claim 4, wherein the focusing/tilting coils are wound in a rectangular shape to be homocentric around the lens mount holes.

6. The actuator according to claim 5, wherein the focusing/tilting coils are wound to have a designated height in the focusing direction.

7. The actuator according to claim 1, wherein the focusing/tilting coils are disposed parallel to each other in the tracking direction.

8. The actuator according to claim 1, wherein the magnetic circuit further comprises a plurality of internal yokes disposed inside the focusing/tilting coils, respectively, for focusing magnetic flux from the focusing/tilting coils.

9. The actuator according to claim 8, wherein the internal yokes are fixed to the base facing sides of the focusing/tilting coils, the sides being arranged in the tracking direction.

10. The actuator according to claim 1, wherein the magnetic circuit further comprises a plurality of external yokes fixed to the base for guiding magnetic flux from the plurality of magnets.

11. The actuator according to claim 10, wherein the plurality of magnets are supported by the external yokes, respectively.

12. The actuator according to claim 1, wherein the pair of tracking coils are installed in both outer surfaces of the bobbin to be in correspondence with the plurality of magnets, respectively.

13. The actuator according to claim 12, wherein the tracking coils are wound in a rectangular shape, and disposed on opposite sides from each other while being laid overlapped with neighboring magnets, respectively.

14. The actuator according to claim 13, wherein the tracking coils are disposed in such a manner that sides of the tracking coils, parallel to the focusing direction, interact with the magnets, respectively, to generate an electromagnetic force.

15. The actuator according to claim 12, wherein in the tracking direction, each tracking coil lies between the focusing/tilting coils.

16. The actuator according to claim 1, wherein the plurality of magnets are a pair of 2-pole magnets polarized in the tracking direction, the polarized magnets being disposed opposite to each other having the bobbin therebetween.

17. The actuator according to claim 1, wherein the bobbin comprises a pair of lens mount holes for mounting the objective lenses, and the mount holes are disposed in a radial direction of a medium.

18. An actuator for a pick-up, comprising:
a holder fixed to a base;
a bobbin to accommodate a pair of objective lenses for recording and/or reproducing information onto and/or from media, each with different recording densities;
a suspension for connecting the bobbin and the holder, and supporting the bobbin to be movable; and
a magnetic circuit for driving the bobbin,
wherein the magnetic circuit comprises:
a pair of focusing/tilting coils wound in correspondence with the pair of objective lenses to be installed in the bobbin;
a pair of tracking coils installed respectively along both outer surfaces of the bobbin; and
a pair of polarized magnets disposed in a radial direction of a medium and having the bobbin therebetween to face the focusing/tilting coils and the tracking coils, respectively.

19. The actuator according to claim 18, wherein the polarized magnets are 2-pole magnets polarized in the tracking direction, respectively, with same polarities thereof being faced with each other, with the bobbin inbetween.

20. The actuator according to claim 18, wherein the focusing/tilting coils are disposed in the tracking direction.

21. The actuator according to claim 18, wherein each tracking coil is disposed between the focusing/tilting coils, being laid overlapped with both focusing/tilting coils, respectively, in the tracking direction.

22. The actuator according to claim 18, wherein the bobbin comprises a pair of lens mount holes for mounting the objective lenses, with the lens mount holes being disposed in the tracking direction.

23. The actuator according to claim 18, wherein the bobbin comprises a pair of lens mount holes having different depths.

24. The actuator according to claim 23, wherein one of the lens mount hole having a longer depth is for a low density medium having a long working distance.

25. A recording and/or reproducing apparatus, comprising:
a spindle motor for rotating a recording medium;
a pickup comprising an objective lens and an actuator which actuates the objective lens so as to transfer information to/from the recording medium;
a control unit driving the spindle motor and the pickup to transfer the information with respect to the recording medium and controlling the actuator of the pickup in track, tilt, and/or focusing directions,
wherein the actuator comprises:
a holder fixed to a base;
a bobbin to accommodate a plurality of objective lenses for recording and/or reproducing information onto and/or from different media, each with different recording densities;
a suspension for connecting the bobbin and the holder, and supporting the bobbin to be movable; and
a magnetic circuit for driving the bobbin,
wherein the magnetic circuit comprises:
a plurality of focusing/tilting coils, installed at the bobbin to be in correspondence with the plurality of lenses, and driving the bobbin in at least one of focusing and tilting directions;
a plurality of magnets having the focusing/tilting coils therebetween, wherein same polarities of the magnets make one pair; and
tracking coils, supported by the bobbin, for generating a driving force to drive the bobbin in a tracking direction.

* * * * *

UNITED STATES PATENT AND TRADEMARK OFFICE
CERTIFICATE OF CORRECTION

PATENT NO. : 7,561,497 B2  Page 1 of 1
APPLICATION NO. : 11/137517
DATED : July 14, 2009
INVENTOR(S) : Jung-gug Pae et al.

It is certified that error appears in the above-identified patent and that said Letters Patent is hereby corrected as shown below:

Column 10, Line 44, change "at" to --inside--.

Column 11, Line 52, change "in" to --inside--.

Column 12, Line 45, change "at" to --inside--.

Signed and Sealed this

Seventeenth Day of November, 2009

David J. Kappos
*Director of the United States Patent and Trademark Office*